United States Patent [19]
Eitrich

[11] Patent Number: 5,748,923
[45] Date of Patent: May 5, 1998

[54] METHOD FOR THE CYCLIC TRANSMISSION OF DATA BETWEEN AT LEAST TWO CONTROL DEVICES WITH DISTRIBUTED OPERATION

[75] Inventor: Frank-Thomas Eitrich, Reutlingen, Germany

[73] Assignee: Robert Bosch GmbH, Stuttgart, Germany

[21] Appl. No.: 530,203

[22] PCT Filed: Feb. 28, 1995

[86] PCT No.: PCT/DE95/00256

§ 371 Date: Sep. 25, 1995

§ 102(e) Date: Sep. 25, 1995

[87] PCT Pub. No.: WO95/25024

PCT Pub. Date: Sep. 21, 1995

[30] Foreign Application Priority Data

Mar. 14, 1994 [DE] Germany .................... 44 08 488.9

[51] Int. Cl.⁶ .................................................. G06F 13/00
[52] U.S. Cl. .................................................. 395/309
[58] Field of Search .................................. 395/280, 287, 395/309, 290, 200.2, 285

[56] References Cited

U.S. PATENT DOCUMENTS

| | | | |
|---|---|---|---|
| 5,345,384 | 9/1994 | Przybyla et al. | 364/424.04 |
| 5,402,394 | 3/1995 | Turski | 368/10 |
| 5,446,846 | 8/1995 | Lennartsson | 395/250 |
| 5,483,230 | 1/1996 | Mueller | 340/825.06 |
| 5,524,213 | 6/1996 | Dais et al. | 395/200.17 |
| 5,588,123 | 12/1996 | Loibl | 395/287 |

*Primary Examiner*—Glenn A. Auve
*Attorney, Agent, or Firm*—Michael J. Striker

[57] ABSTRACT

A method for periodic transmission of data between control devices (10, 11, 12) interconnected via a serial bus (20) is provided, particularly for the transmission of synchronization data. The control devices (10, 11, 12) each have a serial interface (17,17'17") and an arithmetic/control unit (15,18). Data are provided for transmission by the arithmetic/control unit (15, 18) of the control device transmitting the data and are included in a message sent over the serial bus (20). To this end, a transmission job for transmitting the message is provided to the serial interface (17) of control device (10) transmitting the message which controls the transmission. However, this occurs so that, when transmitting the message, use is not made of the data provided at the instant of providing the transmission job, but instead of updated data provided by the arithmetic/control unit in the interim since the instant of giving the transmission job. Moreover, advantageous bus subscriber stations for use in the method presented are also proposed.

26 Claims, 5 Drawing Sheets

METHOD FOR THE CYCLIC TRANSMISSION OF DATA BETWEEN AT LEAST TWO CONTROL DEVICES WITH DISTRIBUTED OPERATION

BACKGROUND OF THE INVENTION

The invention is based on a method for the cyclic transmission of data between at least two control devices with distributed operation, the at least two control devices being interconnected via a serial bus, in particular a CAN bus, and having at least one serial interface and an arithmetic/control unit, data being provided cyclically by the arithmetic/control unit of one of the at least two control devices and being transmitted with the aid of a message via the serial bus and a transmission job for transmitting the message being provided at the serial interface by the arithmetic/control unit of the control device transmitting the message, which job is subsequently handled by the serial interface.

A method for the cyclic transmission of data between at least two control devices with distributed operation is already disclosed in the article "Bussystem für Kfz-Steuergeräte (Bus system for motor vehicle control devices) by W. Botzenhardt, M. Litschel and J. Unruh, VDI Berichte No. 612, pages 459 to 470, 1986. In this article, as an example, the engine speed of an internal combustion engine is determined by an engine controller and cyclically transmitted via a CAN bus system to a transmission controller and a driver information system. The engine speed of the internal combustion engine is subject to continuous variation in the running mode of the internal combustion engine. Therefore, it has to be cyclically transmitted at short time intervals from the engine control device to the transmission controller and to the drive information system. The transmission of the speed data takes place with the aid of a message containing the speed data. The CPU of the engine control device cyclically calculates the engine speed data from the measurement signal of the connected speed sensor. It then passes to the CAN interface of the control device a transmission request for the speed data. In the process, it stores the data to be transmitted in a memory of the CAN interface and sets a transmission request bit in a status register of the CAN interface. However, in the most unfavorable case, a relatively large time difference can occur between the transmission request and the actual transmission of the speed data.

SUMMARY OF THE INVENTION

It is an object of the present invention to provide an improved method of cyclic transmission of data between at least two control devices with distributed operation of the above-described type in which the effects of the above-described disadvantages are reduced in comparison to current methods.

It is also an object of the present invention to provide a bus subscriber station for use in the control devices used in performing the method according to the invention.

According to the invention, the method for cyclic transmission of data between at least two control devices with distributed operation, wherein the at least two control devices are interconnected via a serial bus and each include at least one serial interface and an arithmetic/control unit, and the data is provided cyclically by the arithmetic/control unit of one of the at least two control devices, includes the steps of:

a) providing means for handling a transmission job for transmitting a message including the data in the serial interface of the control device transmitting the data;

b) feeding or inputting the transmission job to the serial interface of the control devices transmitting the message at a predetermined instant or time by means of the arithmetic/control unit of the control device transmitting the message;

c) cyclically passing updated data to the control device transmitting the message and cyclically or periodically replacing the data in the message with the updated data after the feeding of the transmission job to the serial interface and prior to transmission of the message via the serial bus; and d) transmitting the message over the serial bus to another of the control devices by means of the serial interface of the control device transmitting the message after step c).

In contrast, the method according to the invention has the advantage that the transmitted data is considerably more contemporaneous than that of the prior art methods.

A further advantage is that the reduction in the loss of contemporaneity does not necessitate any interventions in the transmission protocol for the serial data transmission. Furthermore, it is possible to exchange messages as desired via the serial bus.

Advantageous developments and improvements of the method according to the invention are possible. Therefore, it is advantageous if in each case one counter, in particular a time or angle counter, is counted continuously in the at least two control devices between which data are cyclically transmitted, and the counter in the control device receiving the data is set to a defined value on the basis of the received data. As a result, synchronization between the control devices is readily possible. It is then also very advantageous that the defined value is directly specified by the received data. A relatively long calculation, which would additionally effect a time delay, does not then have to be carried out first.

It is also advantageous that the time taken to transmit the data is taken into account by the control device which transmits the data, so that the data finally transmitted provide a value which is projected into the future, that value then corresponding to the counter reading of the control device, which transmits the data, at the instant when the message which transmits the synchronization data is expected to be received. As a result, the loss in contemporaneity of the transmitted data can therefore be reduced even further. An appreciable loss in contemporaneity is only produced when the speed of the crankshaft of the internal combustion engine is subjected to great variation in highly dynamic regions.

In order to implement these features in a simple manner, it is advantageous that the counter increments or decrements which occur are counted, during a previous transmission of data, in the control device which transmits the data, and that this value is added to the current counter reading in the event of a subsequent transmission of data.

Another possible way of taking account of the time difference is that the time taken to transmit the data is measured in the control device which transmits the data, that a measurement window for the duration of the measured time value is cyclically produced, that the counter increments or decrements which occur are counted in the measurement window, and that the respectively most up-to-date value is added to the current counter reading in the event of a subsequent transmission of synchronization data. As a result, more account is taken of the engine dynamics.

It is likewise advantageous if the time taken to transmit the data is taken into account by the control device which receives the data, in such a way that the received data are corrected to produce a counter reading for the counter of the receiving control device which corresponds to the counter reading of the control device, which has transmitted the data, at the instant of complete reception of the message which has transmitted the data. In this case, the transmission time would therefore be taken into account by the control device which receives the data. To this end, it is advantageous if, during the transmission of the data, the control device counts the counter increments or decrements of its counter that occur, adds them to the value produced from the received data and then sets its counter to the resultant value. The cycle difference between the counters in the transmitting control device and the receiving control device is then, in turn, appreciable only in the case of large dynamic changes in the speed of the internal combustion engine.

For a bus subscriber station for use in the method for cyclic data transmission, it is advantageous that it has means which, when handling the transmission job, replace at least some of the data stored previously in the shift register of its network interface by the most recent data which have been updated in the interim. A preferred embodiment provides advantageous refinements of this bus subscriber station which do not entail an excessively large circuitry expense.

It is furthermore advantageous that the arithmetic/control unit of the bus subscriber station is designed so that it passes the transmission job cyclically to the serial interface, the control unit having for this purpose a continuously counting counter which emits a signal each time a prescribed counter interval has elapsed, by means of which signal a transmission request bit is set in a status register of the serial interface. The CPU is thereby relieved of this task and the time delay between providing the updated data and setting the transmission request bit is reduced by the CPU latency.

For a further bus subscriber station for use in the method for the cyclic transmission of data, it is advantageous if it has means which, when receiving a message, store at least some of the received data in parallel in a second shift register. This portion of the data is then immediately available to a data processing unit which requires these data. As a result, the CPU of the bus subscriber station does not firstly have to be burdened with fetching the received data from the serial interface and writing them to the necessary data processing unit. The time delay which is produced as a result of the operation of fetching data via the CPU to the data processing unit can thereby be eliminated.

In order that erroneous data do not reach the data processing unit, it is advantageous if the data stored in the second shift register are accepted for processing only when the serial interface has checked the received message to see whether it is free from errors and in the process has established that the message has been transmitted without any errors.

BRIEF DESCRIPTION OF THE DRAWING

An exemplary embodiment of the invention is illustrated in the drawing and explained in more detail in the following description.

DESCRIPTION OF THE PREFERRED EMBODIMENTS

Figure 1:
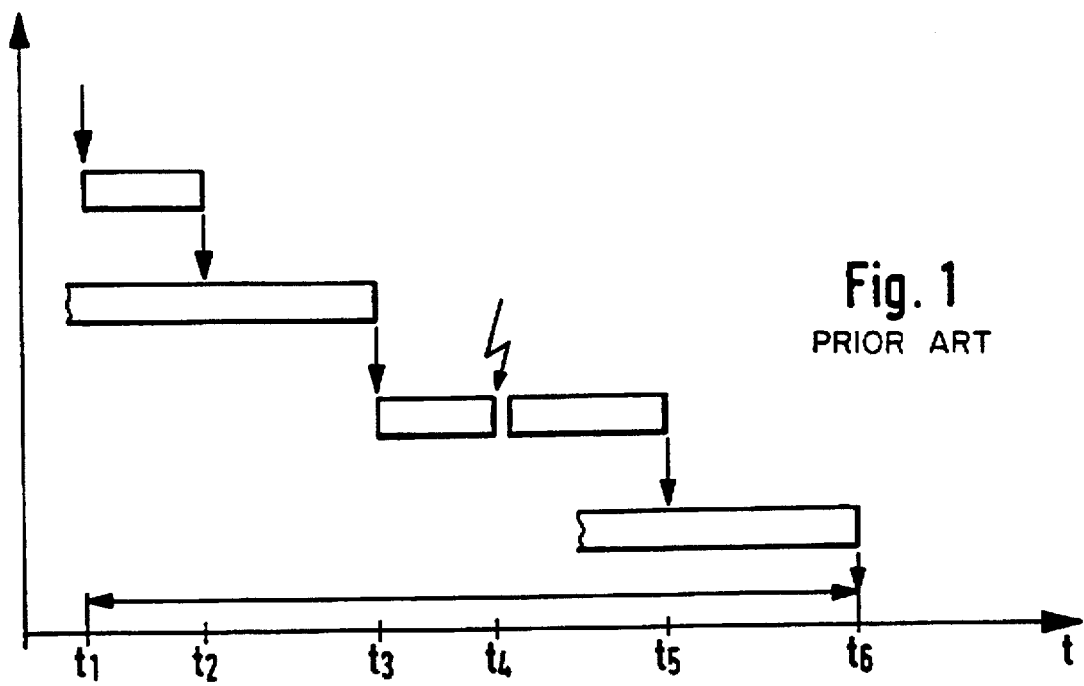
FIG. 1 is a timing diagram for the transmission of a message in accordance with the method known from the prior art.

Initially, FIG. 1 will be used to explain which effects may be responsible for the delay in the transmission of speed data in accordance with the application specified in the section Prior art. The speed acquisition in the CPU of the engine control device takes place at the instant t1. At the instant t2, the CPU of the engine control device sets the transmission request bit in the status register of the CAN interface. The CAN interface cannot execute the transmission job immediately because the bus is still busy with the previously begun transmission of another message. Only at the instant t3 does the CAN interface recognize that the bus is free and begin to transmit the message with the speed data. At the instant t4, the CAN interface recognizes that an error has occurred during the transmission of the message with the speed data, with the result that the message has to be retransmitted anew. The message has then been completely transmitted at the instant t5. However, the transmission controller does not accept the received message until the instant t6, because the CPU of the transmission controller has first of all concluded a calculation which is under way, before it accepts the interrupt from the CAN interface of the transmission control device relating to the message reception. The time delay t6-t5 may also stem from the fact that the CPU of the transmission controller interrogates the CAN interface in accordance with a polling procedure regarding whether or not messages have been received. The time difference t2-t1 is also referred to as the CPU latency. The time difference t3-t2 is also referred to as the bus latency.

In total, a time delay of t6-t1 results between the speed acquisition and the acceptance of the speed data by the transmission control device or the driver information system.

This time difference is not critical in the application as specified in the section Prior art, since the speed data for the transmission controller and the driver information system do not have to be updated within a very short time. However, this time delay can have an adverse effect, for example in the case of distributed engine management, on the engine control (fuel consumption, wear, exhaust gas composition, etc.). In the case of distributed engine management, a central control device is connected via a serial bus to an injection control device and an ignition control device, for example. The central control device carries out the measured value acquisition and from this calculates the ignition and dwell angles for the ignition control device and the injection times for the injection control device. These values are then transmitted via the serial bus to the ignition control device and the injection control device. However, the ignition and injection instructions must be initiated synchronously with the rotary movement of the crankshaft of the internal combustion engine for optimum engine control. In this case, it is necessary that the ignition and injection control devices, too, have to know about the current position of the crankshaft of the internal combustion engine. However, in order to avoid the situation where each of these control devices has to undertake speed acquisition for itself, a proposal has recently been accepted according to which only the central control device acquires the position of the crankshaft of the internal combustion engine and transmits this information via the serial bus to the ignition and injection control devices. However, in this case the contemporaneity of the transmitted data is very important, with the result that it would be desirable further to minimize the time delay between speed acquisition and acceptance of the transmitted speed data in the receiving control device.

Figure 2:
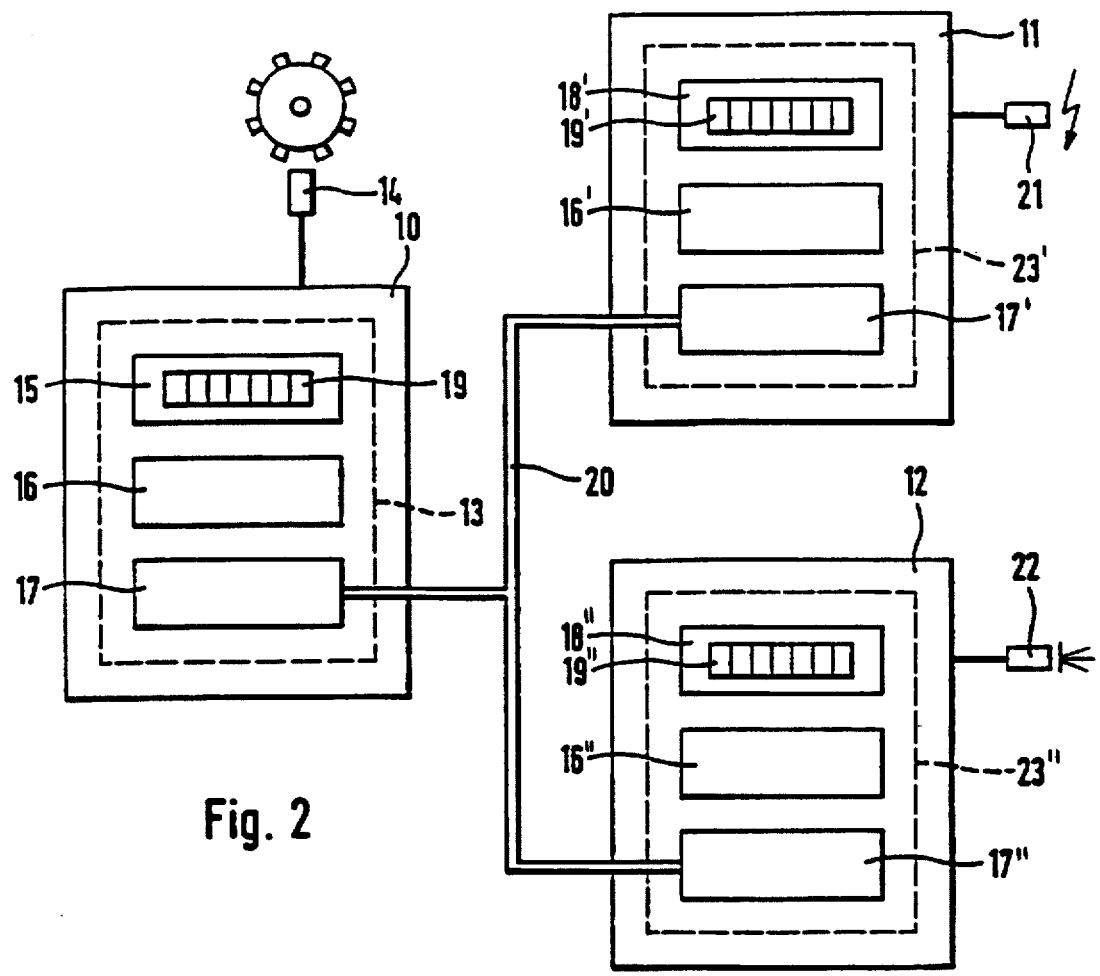
FIG. 2 is a block diagram showing interconnected control devices for distributed engine management.

In FIG. 2, the reference numeral 10 designates a main module of a distributed engine management system. The reference numeral 11 designates the ignition module and the reference numeral 12 designates the injection module for the distributed engine management system. The main module 10, the ignition module 11 and the injection module 12 are interconnected via a serial bus 20. The serial bus 20 may be designed, for example, as a CAN bus. The abbreviation CAN stands for Controller Area Network. This special bus system was developed by the applicant specifically for use in motor vehicles. Details concerning this bus system are sufficiently disclosed in the prior art. For this purpose, reference is made, in particular, to the patent specification DE 35 06 118 C2.

The main module 10 contains a microcomputer 13, comprising a CPU 16, a serial interface 17 and a data acquisition unit 15. The serial interface 17 is designed, for example, as a CAN interface. The structure and the mode of operation of a CAN interface may be taken, for example, from the publication 82526 Serial Communications Controller Architectural Overview, Intel Corp., 1989. The rotary movement of the crankshaft of the internal combustion engine is acquired in the data acquisition unit 15. For this purpose, a crankshaft sensor 14 is connected to the main module 10. The crankshaft sensor 14 detects the rotary movement of the crankshaft and generates a signal upon each revolution of an angle mark of a rotating part which is coupled to the crankshaft of the internal combustion engine. After conditioning, this signal is fed to the data acquisition unit 15. The square-wave pulses occurring per unit time are counted in the data acquisition unit 15. The speed of the internal combustion engine can then be determined from this. However, it is not only the speed which is important information for the engine control, but also, likewise, the respective position of the crankshaft with regard to a reference mark. This then produces, namely, the respective position of the individual cylinders of the internal combustion engine, which positions are necessary for the ignition and the injection control. Therefore, there is provided in the data acquisition unit 15 a counter 19 which is incremented when a signal occurs on account of the revolution of an angle mark on the crankshaft sensor 14. The counter reading of this counter 19 then indicates in each case the current position of the crankshaft. Therefore, the counter 19 is also referred to as an angle clock. In this case, it is also mentioned that the angular resolution on the basis of the revolution of an angle mark is frequently inadequate, with the result that the angle mark signals are divided more finely by special treatment in the data acquisition unit 15. The counter 19 then counts the finely divided angle pulses.

The main module 10 is also used to acquire further engine parameters, such as engine load, engine temperature, battery voltage, etc. It then predicts from the engine parameters the ignition and dwell angles as well as the injection times for the individual cylinders of the internal combustion engine. It then transmits these data via the serial bus 20 to the ignition module 11 and the injection module 12. The ignition module 11 then uses the received values to carry out the ignition and dwell angle control. For this purpose, it no longer needs to carry out engine parameter acquisition for itself. The injection module then likewise carries out, on the basis of the received data, the injection control for the individual cylinders of the internal combustion engine. The injection module 12, too, then no longer needs to carry out engine parameter acquisition for itself. The output stage 22 for driving the injection valve is connected to the injection module 12. The output stage 21 for driving the ignition coil is connected to the ignition module 11. A microcomputer 23' is likewise contained in the ignition module 11. The microcomputer 23' contains in turn, as components, a serial interface 17' and a CPU 16'. Furthermore, it also contains a control unit 18'. A counter 19' is likewise situated in the control unit 18'. The counter 19' likewise serves to indicate the position of the crankshaft of the internal combustion engine. The counter 19' is incremented each time after a specific time interval. In this case, the time interval can be prescribed as desired. In order that optimum control of the engine is ensured, the counter 19 in the main module 10 must run synchronously with the counter 19' in the ignition module 11. This is achieved in that the counter reading of the counter 19 of the main module 10 is read out at specific time intervals and transmitted via the serial bus 20 to the ignition module 11. The counter reading of the counter 19' in the ignition module is then subsequently corrected using the received counter reading.

In principle, the injection module 12 has the same structure as the ignition module 11. A microcomputer 23" having a serial interface 17", a CPU 16", and a control unit 18" is also used in the injection module. A counter 19" is subsequently corrected in the control unit 18" in exactly the same way as has already been described in the case of the ignition module 11.

Figure 3:
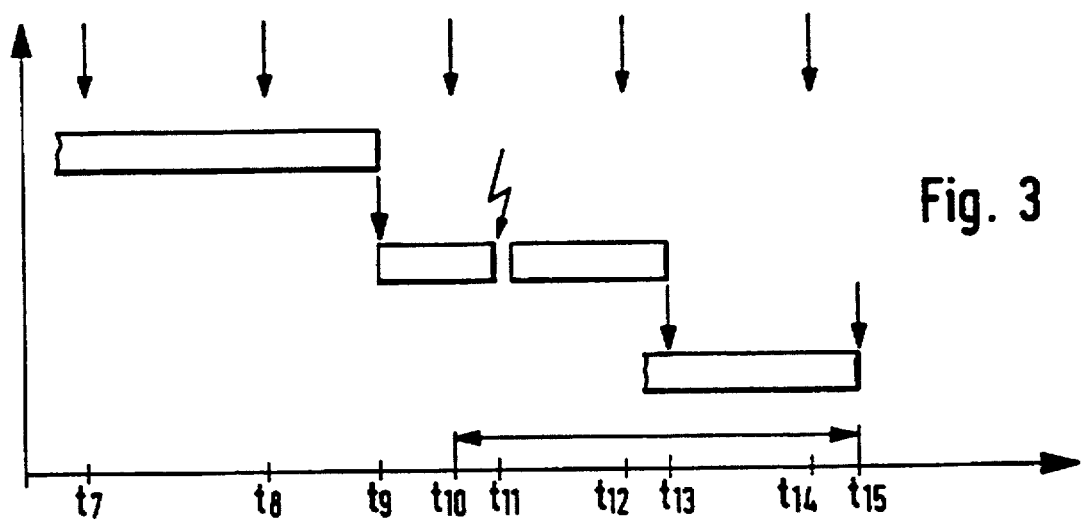
FIG. 3 is a timing diagram for the transmission of a message in accordance with the method according to the invention.

The transmission of a message with the data for the position of the crankshaft will now be explained with reference to FIG. 3.

The position of the crankshaft is acquired at very short time intervals in the central control device, with the result that data are present which are updated in each case at the instants t7, t8, t10, t12 and t14 and relate to the position of the crankshaft. Let it be assumed that a transmission job for transmitting the position of the crankshaft of the internal combustion engine to the CAN interface of the control device which performs the speed acquisition is provided at the instant t7. The transmission job is not then executed until the instant t9, because the bus was still busy until then. However, the data which were transferred to the CAN interface at the instant t7 are not transmitted at the instant t9, but instead the data which have been updated in the interim and have been present since the instant t8. A disturbance occurs again at the instant t11. Therefore, the message is resent. However, the data which were present at the instant t8 are not transmitted during the resending, but instead the updated data which have been present since the instant t10. The transmission of the message with the current data for the position of the crankshaft is concluded at the instant t13. The transmitted data are accepted by the receiving control devices at the instant t15. The loss in contemporaneity of the transmitted data therefore amounts at most to the time difference t15-t10. If the data to be transmitted are provided by the central control device at even shorter time intervals, the time delay can be reduced further.

Figure 4:
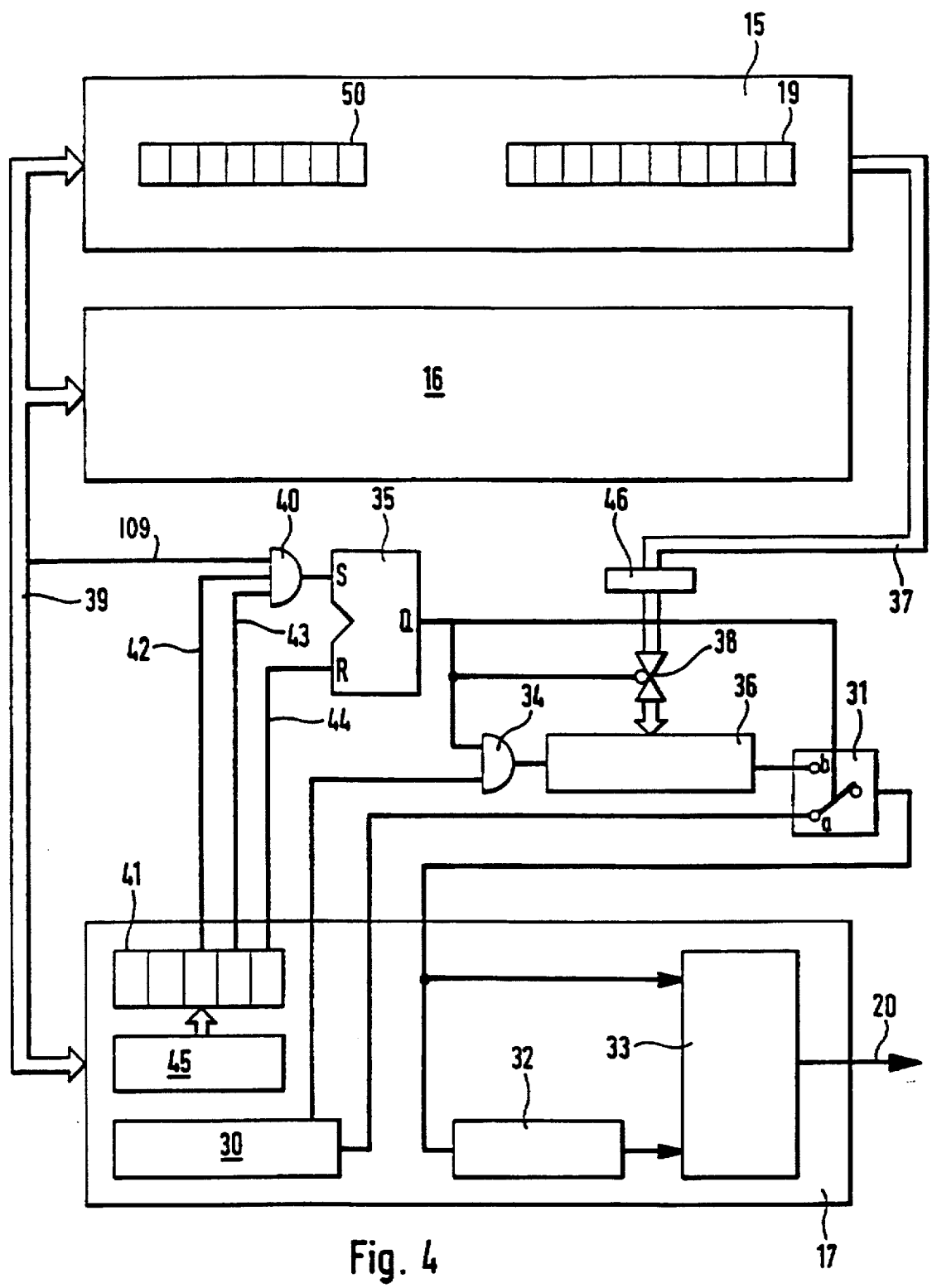
FIG. 4 is a simplified diagram for a first control device of the interconnected control devices.

The structure of the microcomputer 13 of the main module 10 will now be explained in more detail with reference to FIG. 4. In this case, identical reference numerals designate those parts which are identical to those already explained in FIG. 2. The serial interface 17 contains a shift register 30. The output of the shift register 30 is connected to a changeover switch 31. A line leads from the changeover switch 31 to a CRC circuit 32 and to a bus control unit 33. The output of the bus control unit 33 is then connected to the serial bus 20. A line leads from the shift register 30 to a first AND gate 34. The shift clock pulse of the shift register 30 is transmitted via this line. The second input of the AND gate 34 is connected to the output of an R/S flip-flop 35. The output of the AND gate 34 is connected to the clock input of a second shift register 36. The output of the shift register 36 is likewise connected to the changeover switch 31. The changeover switch 31 can be actuated via the Q output of the R/S flip-flop 35. A bus connection 37 leads from the second shift register 36 to the data acquisition unit 15. The data to be transmitted from the counter 19 are permanently fed into the second shift register 36 via this bus connection 37 and the switch 38. A latch 46, which is not absolutely necessary, serves as a data buffer for the bus connection 37.

The switch 38 can be switched through via a signal from the Q output of the R/S flip-flop. Furthermore, the serial interface 17 is connected via a data/address and control bus connection 39 to the CPU 16 and the data acquisition unit 15 of the microcomputer 13. A control line 109 leads from the bus connection 39 to an input of a second AND gate 40. The serial interface 17 also has a status register 41. Control lines 42 and 43 lead from the latter to further inputs of the second AND gate 40. The output of the second AND gate 40 is connected to the set input of the R/S flip-flop 35. A further control line 44 leads from the status register 41 to the reset input of the R/S flip-flop 35. The serial interface 17 also has a bit counter 45. During transmission of a message, the counter reading of the bit counter 45 is used to decide when specific bits of the status register 41 are set. A further counter 50 may also be contained in the data acquisition unit 15.

The mode of operation of the arrangement in FIG. 4 will now be explained in more detail below. Prior to the transmission of a message, the data acquisition unit 15 passes a transmission job to the serial interface 17. For this purpose, it writes the data to be transmitted to the shift register 30 of the serial interface 17. The time when the transmission job is provided in each case is prescribed by the counter 50. At the same time, the data acquisition unit also sets a transmission request bit in the status register 41 of the serial interface 17. The serial interface 17 then handles the transmission job independently. The data to be transmitted are transmitted in a message having a specific message format. The message format for the CAN bus is illustrated in more detail in FIG. 5. The message begins with an SOF (Start of Frame) bit. There then follows an ID (Identifier) field. This field specifies which data are transmitted by this message. The identifier thus has the function of a data name (position of the crankshaft of the internal combustion engine, engine temperature of the internal combustion engine, engine speed, ignition angle for cylinder 1, etc.). A CONTROL field is then transmitted. This field can be used for various purposes. As an example, information specifying the length of the following data may be entered in the field. After the CONTROL field, there then follows the data field having the actual data. After the data field, a CRC field is then transmitted as well. This field is used for data transmission protection. A code is stored in this field. Using this code the receiving control device can recognize whether or not the message has been transmitted without any errors. The message is concluded by an ACK field, in which the receiving station can confirm reception of the message.

Figure 6:
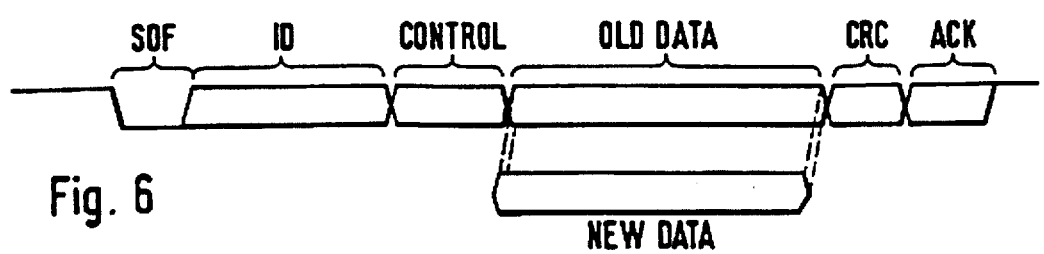
FIG. 6 is a signal diagram showing the correction, according to the invention, of the transmitted data.

After the serial interface 17 has received the transmission job for transmitting data regarding the current position of the crankshaft, it monitors the connected bus 20 to see whether or not it is busy. As soon as the serial interface recognizes that the bus is free, it then starts transmitting the message which has been ordered. At this instant, the changeover switch 31 is switched in position a, with the result that the data in the shift register 30 of the serial interface 17 can pass via the bus control unit 33 to the connected serial bus 20. When transmitting the message, the bit counter 45 has then also been started. A bit in the status register 41 has been set at the same time as the bit counter was started, with the result that the control line 42 applies a "1", signal to the corresponding input of the second AND gate 40. The first input line 109 of the AND gate 40 was set to a "1" level by the CPU 16 when the transmission job was provided at the serial interface 17. After the Identifier field and also the CONTROL field have been transmitted via the shift register 30 to the bus line 20, the bit counter 45 arrives at a counter reading which causes a further bit in the status register 41 to be set. As a result, a "1" signal is also applied to the third input of the AND gate 40 via the transmission line 43. The R/S flip-flop 35 is consequently set. In response, the changeover switch 31 is switched over to position b via the Q output of the R/S flip-flop 35. At the same time, the switch 38 is switched off and the reading of the counter 19 at the instant of setting the R/S flip-flop 35 is thus recorded in the second shift register 36. As a result of the signal at the Q output of the R/S flip-flop 35, there is a logic "1" signal at the corresponding input of the AND gate 34. As a result, the AND gate 34 then conducts each time the bit timing signal from the shift register 30 of the serial interface 17 generates a logic "1" signal. Consequently, the shift register 36 is clocked starting at this instant and the data accepted in the shift register 36 are transmitted via the changeover switch 31 to the serial bus 20. After the last bit of the data field has been transmitted, the bit counter 45 again arrives at a counter reading which causes a further bit in the status register 41 to be set. As a result of this bit being set, the R/S flip-flop 35 is reset via the transmission line 44. Consequently, the changeover switch 31 is actuated via the Q output of the R/S flip-flop 35, with the result that the switch 31 once more assumes the switch position a. The AND gate 34 is likewise inhibited, with the result that no further clock signals can pass to the shift register 36. Subsequently, the CRC field is additionally transmitted from the CRC unit 32 to the serial bus 20. The bus control unit 33 then also outputs the ACK field to the serial bus 20. A message transmission is accordingly concluded. It was therefore achieved by the arrangement according to the invention that the data which have been provided by the data acquisition unit 15 when the transmission job for transmitting the current crankshaft position was provided have been replaced by those data which were present in the counter 19 at the instant of transmitting the data field and consequently had greater contemporaneity. This is also illustrated in FIG. 6.

Figure 7:
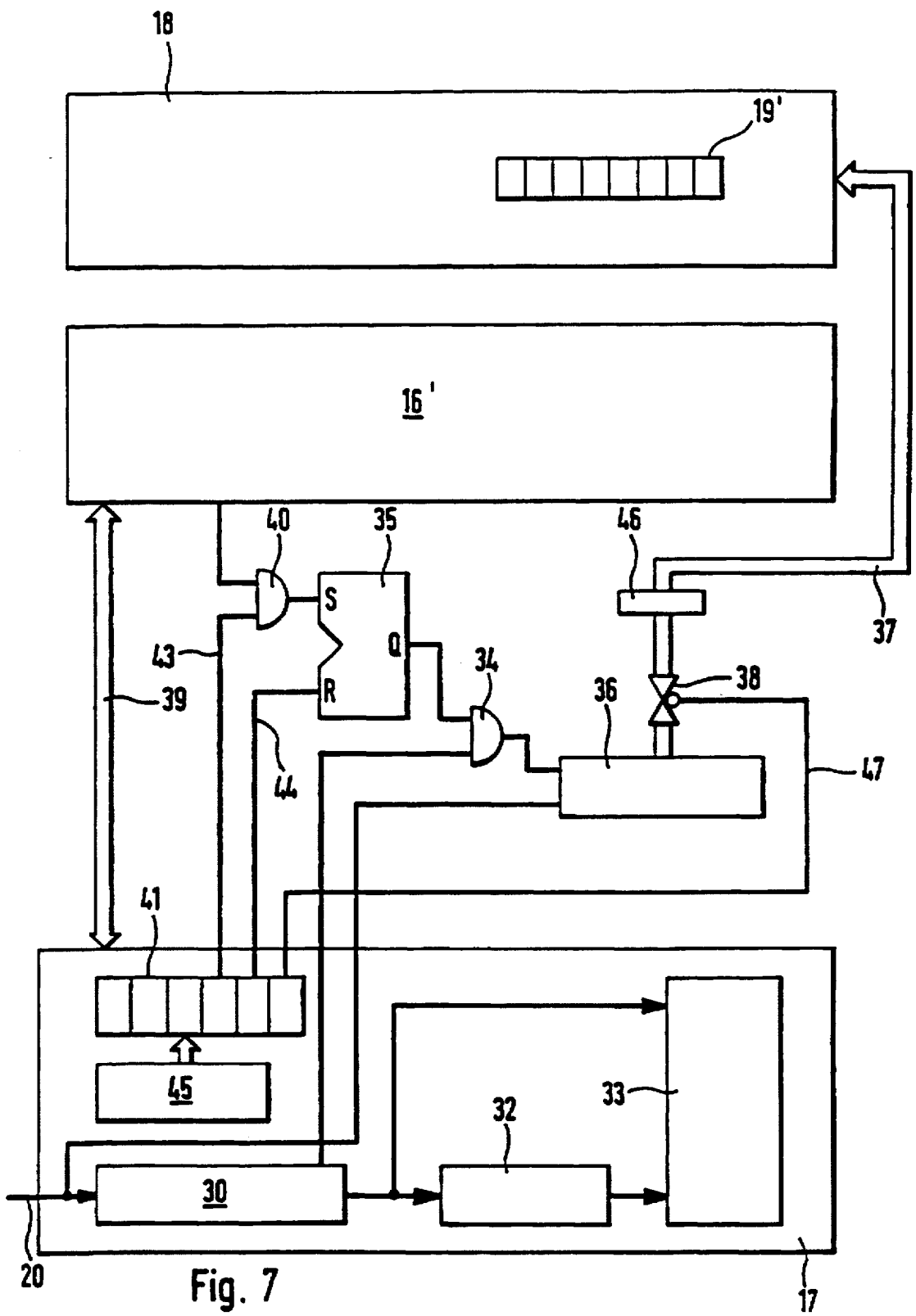
FIG. 7 is a simplified block diagram for a second control device of the interconnected control devices.

The structure of the microcomputer 23' of the ignition module 11 will be explained in more detail below with reference to FIG. 7. Insofar as the structure corresponds to the structure of the microcomputer 13 of the main module 10, the same reference numerals were to that extent used in the illustration of the ignition module 11. It is therefore unnecessary to describe the same components again. There is a difference in as much as a changeover switch is not provided for the microcomputer 23'. The serial bus 20 is connected both to the data input of the shift register 30 and to the data input of the second shift register 36. A further difference is the fact that the switch 38 is no longer driven by the Q output of the R/S flip-flop 35 and the data standing by in the second shift register 36 are permanently transmitted to a latch 46 for buffering. The switch 38 is likewise driven from the status register 41. The AND gate 40 now only has two inputs.

The mode of operation when receiving a message which transmits the current position of the crankshaft of the internal combustion engine is explained in more detail below. The bit counter 45 is started immediately following the reception of the start of frame bit of a message. The received bits are successively inserted into the shift register 30. After the CONTROL field has been completely received, the bit counter 45 arrives at a counter reading at which a bit is set in the status register 41. As a result of the setting of this bit, the line 43 causes the AND gate 40 to conduct if a logic "1" signal has simultaneously been applied to the first input of the AND gate 40 by the CPU 16". The CPU 16" sets this input of the AND gate 40 to a "1" signal as early as during the initialization phase of the microcomputer 23'. With the setting of the bit in the status register 41, the R/S flip-flop 35 is consequently set as well. The Q output of the R/S flip-flop 35 then causes the AND gate 34 to conduct the clock pulses of the shift register 30, with the result that the shift register 36 is now clocked as well. The data now arriving are therefore accepted both in the shift register 30 and in the shift register 36. After the last bit of the data field has been received, the bit counter 45 again arrives at a counter reading at which a bit is set in the status register 41. As a result of the setting of this bit, the R/S flip-flop 35 is reset via the line 44. As a result, the AND gate 34 is inhibited and no further data can be accepted in the shift register 36. The CRC field and the ACK field are then also stored in the shift register 30. After the message had been completely received, it is checked by the bus control unit 33 and the CRC generating unit 32. If transmission errors have occurred, then the message in the shift register 30 is rejected. However, if the message had been received without any errors and the identifier corresponded to that for the data for the position of the crankshaft, then a bit is set in the status register 41, with the result that the line 47 causes the switch 38 to be switched to conduct. The stored contents of the shift register 36 are then transferred to the latch 46. It is thus available to the control unit 18', via the bus connection 37, starting at this instant. The control unit 18' can use the stored contents in the latch 46 directly to subsequently synchronize the counter 19'. This can be done in the simplest case by the control unit 18' adjusting the counter reading of the counter 19' to the value stored in the latch 46.

The status bit, which is routed via the line 47 to the switch 38, of the status register 41 is reset prior to the reception of a new data field of a following message from the serial bus 20.

As a result of the method described here, the latency of transmitting temporally changing values is reduced to the transmission time of a message. If a CAN bus is used as the serial bus 20, then this time is between 50 and 75 microseconds at a transmission rate of 1 MBAUD and 32 data bits for the position of the crankshaft and the engine speed. This value can be reduced even further by reducing the number of pertinent data bits. This value is so small that the latency may even be ignored in most applications.

Even more methods are described below by means of which even this latency can still be reduced. In the event of a small dynamic change in the rotary movement of the crankshaft of the internal combustion engine since the last reception of a message with the position of the crankshaft, it can be assumed that the counters in the ignition module 11 and in the injection module 12 indicate a value which is already almost correct for the position of the crankshaft.

In the case of each received synchronization message, therefore, a further counter is started in the control unit 18', which counter counts the increments of the counter 19' which have occurred starting from the transmission of the first bit of the data field of the message up to complete reception of the message. In this case, the control signal for this counter is supplied, for example, by the Q output of the R/S flip-flop 35. If the message is recognized as being valid, due to the activation of the line 47, and identified as being a synchronization message, the counter contents of the further counter are added to the item of message data on the bus connection 37 and thus produce the current reading for the counter 19' to which the latter must be synchronized. Even in the event of large dynamic changes of the crankshaft, the possible error is only as large as the number of changing increments during the transmission time from the first data bit to the acknowledge field. The fact that the additional circuitry expense is only low is also to be regarded as an advantage of this solution.

Another embodiment relates to the precorrection on the transmitter side of the synchronization data to be transmitted. When transmitting a synchronization message, the main module 10 starts a further counter which counts the number of increments of the counter 19 which occur starting from the transmission of the first data bit up to complete transmission of the message. If the message is stopped or a disturbance occurs, this information is rejected. If the synchronization message has been completely transmitted, this value is stored and the sum of this value and of the current counter reading of the counter 19 is transmitted instead of the current counter reading of the counter 19 when transmitting the next synchronization message. The expected value, which ought to be present at the end of the transmission of the synchronization message, of the counter 19 is transmitted in this way. In this case, too, the dynamic change in the internal combustion engine since the last synchronization message then determines the accuracy of the angle clocks.

In the case of an additional possible embodiment, an additional counter is started in the data acquisition unit 15 of the main module 10 at the start of transmission of the data field of a synchronization message, which counter measures the time until complete transmission of the synchronization message. If the message is stopped or if a disturbance has occurred, this information is rejected. This value is stored in the event of successful transmission of the message. A second additional counter, which may be identical to the first counter, uses this stored time value to generate a time window in which a third additional counter counts the number of increments of the counter 19 which are generated in this time window. The sum of this value and of the current counter reading of the counter 19 is transmitted when transmitting the next synchronization message. This solution has the advantage that the dynamic uncertainty is limited to the time between two measured time windows.

In the case of the CAN bus, an additional stuff bit is always inserted into the message by the bus control unit 33 of the CAN interface when an uninterrupted sequence of six successive bits having the same bit level would otherwise be produced on account of the data to be transmitted. As a result of the insertion of these stuff bits, there is also a latency uncertainty in the transmission of synchronization data. This uncertainty exists in the methods presented hitherto for the further reduction of the latency. Therefore, in the case of another embodiment, the number of stuff bits occurring during the message is estimated. The result then is an estimated, constant total time value for the generation of the time window. The increments of the counter 19 are then counted again during this time window. As in the case of the previously presented embodiment, the sum of this value and of the current counter reading of the counter 19 is then transmitted as a synchronization parameter when transmitting the next synchronization message. The dynamic uncertainty is just as great in this embodiment as in the preceding embodiment, but the possible number of stuff bits is also taken into account.

A further embodiment attempts to reduce the dynamic uncertainty further. In this case, as in the case of a preceding embodiment, the transmission time of the last synchronization message is measured. The main module 10 also stores in a FIFO memory (first-in first-out) the times when the counter 19 is incremented. For each entry, the main module 10 checks whether the initially entered times have still occurred within the measurement window, the end of the measurement window being in each case the time of the last increment. If the earliest time is outside the measurement window, the main module 10 rejects this entry in the FIFO memory, with the result that only the last, current increments are entered in the FIFO memory. The number of entries in this memory is then added in the end to the current counter reading of the counter 19 when transmitting the synchronization message, and the sum is then transmitted. As a result, the dynamic uncertainty is reduced approximately to the time of a measurement window. However, even in this solution the number of stuff bits is indeterminate.

An additional embodiment attempts to reduce further the uncertainty produced by the stuff bits. It is virtually impossible to predict the expected number of stuff bits unless an additional, very powerful computer is used, since that number is dependent on the data and this data depends in turn on the number of stuff bits. However, there is a possible maximum number of stuff bits which can be taken into account. The minimum time until complete transmission of a synchronization message without any stuff bits is known given a known transmission rate of the serial bus. A time value is then generated for every possible number of stuff bits. A number of "first counters" uses these total time values to generate in each case a time window in which a set of "second counters" counts the number of increments of the counter 19 which occur in these time windows. Together with the knowledge of the CRC code, the actual number of stuff bits for the individual measurements is determined, and the measurement which has the smallest difference between the assumed and determined stuff bit numbers is then used in the next transmission of a synchronization message. In this embodiment, the dynamic uncertainty is reduced to approximately the transmission time of one bit.

In the following embodiment which is presented, the number of stuff bits is once more estimated anew by the main module 10 prior to the transmission of a synchronization message. The minimum time until complete transmission of the synchronization message without any stuff bits is known given a known transmission rate of the serial bus 20. Equally, the maximum time when using the maximum number of stuff bits is known. The main module 10 now predicts the instants of future increments of the counter 19, for example from the stored times at which there was previously an increment in each case. It determines the number of increments for a message without any additional stuff bits, as in the case of the preceding solutions. The number of counter increments for a message having the maximum number of stuff bits is likewise determined. If these two numbers correspond, this number is added to the current counter reading of the counter 19 and this sum is provided as synchronization data for the next synchronization message.

If the two numbers do not correspond, the numbers of stuff bits which also produce this value are determined for each of these values and all of the possible intermediate values. That sum which yields the smallest difference between assumed and calculated counter increments is then used for the synchronization message.

EXAMPLE

Without any stuff bits, the message would have a length at which ten counter increments would have to be subsequently corrected. With an assumed maximum number likewise of ten stuff bits, the message would have a length at which twelve counter increments would have to be subsequently corrected. Since these two numbers do not correspond, there must be further subdivision:

given a stuff bit number of between 0 and 1, ten counter increments are subsequently corrected;

given a stuff bit number of between 2 and 6, eleven counter increments are subsequently corrected;

given a stuff bit number of between 7 and 10, twelve counter increments are subsequently corrected.

It is calculated that:

seven additional stuff bits would have to be inserted given a message with an angle clock value of +10. However, there would be 12 counter increments during this time; one additional stuff bit would have to be inserted given a message with an angle clock value of +11. However, there would be only 10 counter increments during this time; zero additional stuff bits would have to be inserted given a message with an angle clock value of +12. However, there would be only 10 counter increments during this time.

Therefore, the smallest difference is produced with the assumed number of 11 additional counter increments, so that this value is used for the synchronization message.

It should be noted that further iteration steps are possible for the predictive correction of the number of stuff bits, but they do not necessarily yield better results. In the above Example, it is calculated with the correction of 10 increments that in actual fact 12 increments would be necessary; given a correction of 12 increments, 10 increments would be necessary.

Figure 8:
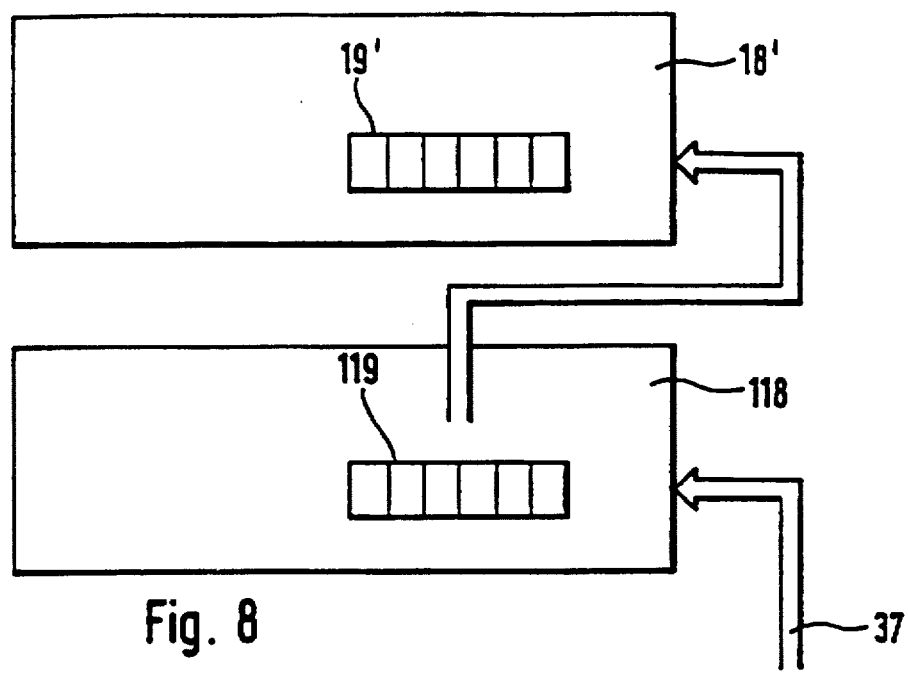
FIG. 8 is a simplified block diagram of a control unit in accordance with FIG. 7 having a second control unit.

A further embodiment for the method of correction at the receiver end takes account, during reception of the CRC field and ACK field, of the data which have already been completely transmitted but not yet verified. In this case, an additional counter in the microcomputer 23 counts the time necessary to transmit the data field. A second angle clock counter 119 in a second control unit 118 is (as illustrated in FIG. 8) corrected with the received data from the second shift register 36 immediately following reception of the data field, identified by the activation of the line 44. The processing speed (frequency of the counter increments) of the second control unit 118 is then increased, whereas the additional counter is counted down corresponding to this increase in speed, with the result that when zero is reached in the additional counter, the second angle clock counter 119 corresponds to the current status of the counter 19' of the transmitting microcomputer 13. The processing speed of the angle clock counter 119 is then normalized again.

When the correction transmission is actuated via the activation of the line 47, the counter 19' of the control unit 18' is corrected to the value of the second angle clock counter 119 of the second control unit 118. If the received data are identified as being erroneous, the counter reading of the second angle clock counter 119 is rejected.

The invention is not restricted to the exemplary embodiment presented here. Instead of the synchronization of two angle clocks for distributed engine management, the measured values of any other clock-like data source could also be transmitted in the manner described here. In addition to the transmission of synchronization messages described here, it is also possible for any other messages having different identifiers to be transmitted via the serial bus. In these cases, the changeover switch remains switched in switch position a, with the result that data replacement does not take place. However, it would also be possible to provide data replacement for a plurality of messages having specific identifiers. For implementations with a plurality of parallel, external shift registers, an expanded changeover switch or multiplexer having a plurality of inputs must then be used. Finally, a plurality of different latches 46 could also be provided for a single external shift register.

In another variant of the invention, it is possible to dispense with the second shift register 36 in the microcomputer 23 of the modules 11 and 12 if the parallel data outputs of the shift register 30 are routed out of the serial interface 17. In this case, the elements in FIG. 7 which are designated by the numbers 34, 35, 40, 43, 44 are also unnecessary.

In an additional variant of the invention, it is possible to dispense with the second shift register 36 in the microcomputer 13 of the main module 10 if the parallel data inputs of the shift register 30 are routed out of the serial interface 17 and, when the R/S flip-flop 35 is turned on, the data from the bus connection 37 are transmitted to the shift register 30. In this case, the elements in FIG. 4 which are designated by the numbers 31, 34, 38 are also unnecessary.

Figure 5:
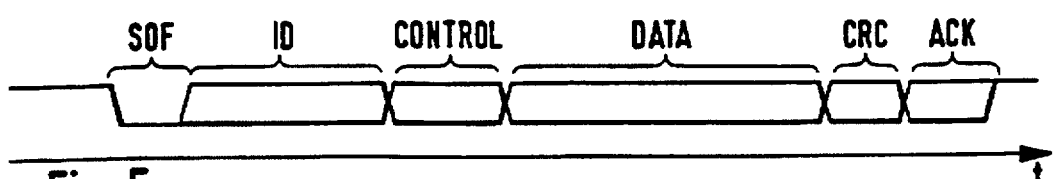
FIG. 5 is a signal diagram of the data of a message transmitted according to the CAN protocol.
Figure 9:
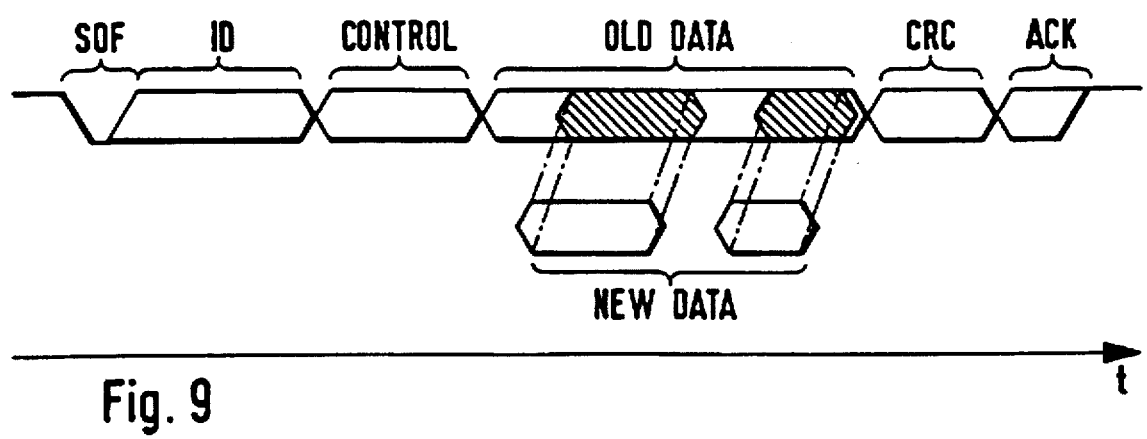
FIG. 9 is a signal diagram showing a variant from FIG. 6.

In a further variant of the invention, only part (not necessarily continuous) of the data field of FIG. 5 is replaced by the invention during transmission (cf. FIG. 9).

I claim:

1. A method for cyclic transmission of data between at least two control devices (10,11,12) with distributed operation, wherein the at least two control devices (10,11,12) are interconnected via a serial bus (20) and each include at least one serial interface and an arithmetic/control unit, and said data is provided cyclically by said arithmetic/control unit of one of the at least two control devices (10,11,12), said method including the steps of:

a) providing means for handling a transmission job for transmitting a message including said data in said serial interface of said one (10) of said at least two control devices (10,11,12) transmitting said data;

b) feeding the transmission job to said serial interface of said one (10) of said at least two control devices (10,11,12) transmitting said message at a predetermined instant by means of the arithmetic/control unit of said one of said at least two control devices transmitting the message;

c) after the feeding of step b), cyclically passing updated data to said one (10) of said at least two control devices (10,11,12) transmitting said message and replacing said data in said message with said updated data prior to transmission of said message via said serial bus; and d) transmitting said message over said serial bus to another of said at least two control devices (10,11,12) by means of said serial interface of said one (10) of said at least two control devices (10,11,12) transmitting said message after step c).

2. The method as defined in claim 1, wherein said serial bus is a CAN bus and said data comprises synchronization data.

3. The method as claimed in claim 1, further comprising providing a counter (19,191,191) in each of said at least two control devices (10,11,12), counting each of said counters continuously and setting the counter (19',19") in the one (11,12) of said at least two control devices (10,11,12) receiving said message including the data to a defined value on the basis of the data received therein.

4. The method as defined in claim 3, wherein said counter is an angle counter.

5. The method as defined in claim 3, wherein said counter is a time counter.

6. The method as defined in claim 3, wherein said defined value is specified by said data received in said one of said at least two control devices receiving said message.

7. The method as claimed in claim 6, further comprising taking into account a data transmission time for said data included in said message over said serial bus by means of said one (10) of said at least two control devices (10,11,12) transmitting said message, so that said data included in said message transmitted over said serial bus (20) corresponds to a counter reading of said counter (19) in said one (10) of said at least two control devices (10,11,12) transmitting said message at the instant of complete transmission of said message over said serial bus (20).

8. The method as claimed in claim 7, further comprising adding counter increments or decrements of said counter (19) to a current counter reading of said counter (19) in said one (10) of said at least two control devices (10,11,12) transmitting said message during said data transmission in the event of a subsequent transmission of said data.

9. The method as claimed in claim 7, further comprising measuring said data transmission time in said one (10) of said at least two control devices (10,11,12) transmitting said message, cyclically producing a measurement window during said measuring of said data transmission time, counting counter increments or decrements of said counter (19) in said one (10) of said at least two control devices (10,11,12) during said measurement window to form a count, and adding a respectively most up-to-date value of said counts to a current counter reading of said counter (19) in the event of a subsequent transmission of said data.

10. The method as claimed in claim 3, further comprising taking into account a data transmission time of said data over said serial bus by means of another (11,12) of said at least two control devices (10,11,12) receiving said message including said data so that said data (11,12) received in said another of said at least two control devices are corrected after being received to produce a counter reading in said counter (19') of said another (11,12) of said at least two control devices (10,11,12) receiving said message the control device (11,12) corresponding to a counter reading of said one (10) of said at least two control devices (10,11,12) which has transmitted said data at the instant of complete reception of said message including said data.

11. The method as defined in claim 10, further comprising counting counter increments or decrements of said counter (19') during said data transmission in said another (11,12) of said at least two control devices receiving said message including said data to form a count and adding said count to a value in said counter (19') produced from said data received in said another (11,12) of said at least two control devices receiving said message to form a defined value to which said counter (19') in said another (11,12) of said at least two control devices receiving said message is set.

12. The method as defined in claim 10, further comprising correcting said data received in said another of said at least two control devices (10,11,12) by a second control unit (118) during a time interval between reception of said data and confirmation of transmission validity to form a corrected value, and setting said counter (19') of said another of said at least two control devices (10,11,12) to said corrected value as the defined value for said counter (19') upon confirmation of said transmission validity.

13. A bus subscriber station for use in a method for cyclic transmission of data over a serial bus between at least two control devices (10,11,12) connected to said serial bus, in which said data incorporated in a transmitted message passed between said at least two control devices over said serial bus is periodically updated in said one (10) of said at least two control devices (10,11,12) transmitting said message until the instant of said transmission, said bus subscriber station comprising an arithmetic/control unit (15, 18) including means for periodically providing updated data for transmission via said serial bus (20), a serial interface (17) to which said serial bus (20) is connected, wherein the serial interface h as a first shift register (30) in which said data to be transmitted are stored and a control circuit including means (36,31) for replacing at least so-me of said data stored previously in the first shift register (30) with updated data updated most recently in the interim by said arithmetic/control unit (15,18) after storing said data in the first shift register (30).

14. The bus subscriber station as defined in claim 13, wherein said means (36,31) for replacing at least some of said data stored previously by the updated data comprise a second shift register (36) in which the updated data are stored at a predetermined instant (t9) and a changeover switch (31) having a first switched state (A) and a second switched state (B) and connecting the serial bus (20) to an output of the first shift register (30) via the first switched stated (A) and to an output of the second shift register (36) via the second switched state (B).

15. The bus subscriber station as defined in claim 14, wherein the changeover switch (31) is a multiplexer.

16. The bus subscriber stat ion as defined in claim 13, wherein the serial interface (17) includes a bit counter (45) having means for concomitantly counting bits transmitted per each of said messages, and said bit counter (45) comprises means for determining an instant for storing said updated data in the second shift register (36) and for determining another instant for switching said changeover switch (31) between said switched states (A,B).

17. The bus subscriber station as defined in claim 13, further comprising means for controlling an internal combustion engine including a crankshaft and having an engine speed, means for measuring a rotary displacement of said crankshaft, and wherein said updated data indicate at least one of an instantaneous position of the crankshaft of the internal combustion engine and an instantaneous value of said engine speed.

18. The bus subscriber station as defined in claim 13, further comprising a continuously counting additional counter (50) including means for transmitting a signal to the serial interface (17) each time a predetermined counter interval has elapsed and said serial interface (17) includes means for setting a transmission request bit in a status register (41) of the serial interface (17) in response to said signal.

19. A bus subscriber station for use in a method for cyclic transmission of data over a serial bus between at least two control devices (10,11,12) connected to said serial bus, in which said data incorporated in a transmitted message passed between said at least two control devices over said serial bus is periodically updated in said one (10) of said at least two control devices (10,11,12) transmitting said message until the instant of said transmission, said bus subscriber station comprising a first control unit (18') and a second control unit (118'), a serial interface (17',17") to which said serial bus (20) is connected, wherein the serial interface has a shift register (30) into which said data received via said serial bus (20) are stored, and a control circuit including means (38,46) for making at least some of said data received in said shift register available for processing in the second control unit (118) as early as during a validity check of said data.

20. The bus subscriber station as defined in claim 19, wherein said second control unit (118) includes means for calculating informational entities for processing in the first control unit (18') only when the serial interface (17) has checked the data received to determine whether said data received is free from errors.

21. A bus subscriber station for use in a method for cyclic transmission of data over a serial bus between at least two control devices (10,11,12) connected to said serial bus, in which said data incorporated in a transmitted message passed between said at least two control devices over said serial bus is periodically updated in said one (10) of said at least two control devices (10,11,12) transmitting said message until the instant of said transmission, said bus subscriber station comprising a serial interface (17',17") to which said serial bus (20) is connected, wherein the serial interface has a first shift register (30) into which said data received via said serial bus (20) are stored, a second shift register (36) for parallel storage of said data received in said first shift register and means for storing said data received in said first shift register in said second shift register.

22. The bus subscriber station as defined in claim 21, further comprising means for checking said data received for errors and means for accepting said data stored in the second shift register (36) for processing only if said data received is determined to be free from errors during said checking.

23. The bus subscriber station as defined in claim 21, wherein the serial interface (17',17") has a bit counter (45) including means for concomitantly counting bits received per message containing said data, and means for determining an instant for beginning and another instant for ending of storing of said data in the second shift register (36).

24. The bus subscriber station as defined in claim 21, further comprising means for controlling an internal combustion engine including a crankshaft and means for periodically receiving via the serial bus (20) said data including at least one of an instantaneous position of said crankshaft and an instantaneous speed of the internal combustion engine.

25. The bus subscriber station as defined in claim 24, wherein said means for controlling an internal combustion engine includes an ignition control device.

26. The bus subscriber station as defined in claim 24, wherein said means for controlling an internal combustion engine includes an injection control device.

* * * * *